(12) United States Patent
Murata et al.

(10) Patent No.: US 6,598,698 B2
(45) Date of Patent: Jul. 29, 2003

(54) ELECTRIC POWER STEERING APPARATUS

(75) Inventors: Makoto Murata, Wako (JP); Osamu Tsurumiya, Wako (JP); Tomoaki Sugano, Wako (JP); Atsushi Kurauchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/115,214

(22) Filed: Apr. 2, 2002

(65) Prior Publication Data

US 2002/0166714 A1 Nov. 14, 2002

(30) Foreign Application Priority Data

May 11, 2001 (JP) ..................................... 2001-141079

(51) Int. Cl.[7] ................................................ B62D 5/04
(52) U.S. Cl. .................. 180/443; 180/446; 701/41; 701/43
(58) Field of Search ....................... 180/443, 446; 701/41, 43; 318/432, 433, 434; 388/903; 361/23

(56) References Cited

U.S. PATENT DOCUMENTS

| | | | | |
|---|---|---|---|---|
| 5,014,801 A | * | 5/1991 | Hirose | 180/140 |
| 5,052,508 A | * | 10/1991 | Soejima | 180/234 |
| 5,339,243 A | * | 8/1994 | Matsuoka et al. | 364/424.05 |
| 5,992,556 A | * | 11/1999 | Miller | 180/446 |
| 6,029,767 A | * | 2/2000 | Kifuku | 180/443 |
| 6,148,949 A | * | 11/2000 | Kobayashi et al. | 180/446 |
| 6,213,249 B1 | * | 4/2001 | Noro et al. | 180/446 |
| 6,223,852 B1 | * | 5/2001 | Mukai et al. | 180/446 |
| 6,448,728 B2 | * | 9/2002 | Noro et al. | 318/433 |

FOREIGN PATENT DOCUMENTS

JP 3-114974 5/1991

* cited by examiner

Primary Examiner—Lesley D. Morris
Assistant Examiner—Tony Winner
(74) Attorney, Agent, or Firm—Merchant & Gould P.C.

(57) ABSTRACT

An electric power steering apparatus 1 comprises an electric motor 8, a vehicle speed detecting section (vehicle speed sensor) VS, a shifting state detecting section for detecting a shifting state of the vehicle, an engine rotational speed detecting section (engine rotational speed sensor) ES, and a motor control section (controller) 12 for controlling drive of the electric motor 8. The motor control section 12 includes a failure determination section (vehicle speed sensor failure determination section) 21 for determining failure of the vehicle speed detecting section on the basis of a vehicle speed, a shifting state and an engine rotational speed. The failure determination section 21 determines that the vehicle speed detecting section VS malfunctions if the engine rotational speed is equal to or greater than a predetermined rotational speed for a determinative continuous-time and/or a first determinative integrated time while the vehicle speed is zero and the shifting state is a vehicle driving state.

8 Claims, 6 Drawing Sheets

ELECTRIC POWER STEERING APPARATUS

FIELD OF THE INVENTION

The present invention relates to an electric power steering apparatus, which applies power of an electric motor directly to a steering system so as to ease steering effort of the driver.

BACKGROUND OF THE INVENTION

Electric power steering apparatus assists steering effort of the driver by way of applying an assist torque that is generated by directly utilizing a driving force of an electric motor to a steering system. To this end, the electric power steering apparatus is furnished with a motor control section for setting a target current supplied to the electric motor as well as for applying the target current to the electric motor with feed back control. In the motor control section, the target current is set at least on the basis of vehicle speed detected by the vehicle speed sensor. The target current is set to a higher value in the case of a lower vehicle speed having a greater road reaction force, and is set to a lower value in the case of a higher vehicle speed to secure the stability during driving. For this reason, when the vehicle speed sensor malfunctions, the vehicle speed sensor always detects the vehicle speed of 0 km/h and the motor control section sets the target current to a greater value, so that a large assist torque continues to act on the steering system. Various methods for determining failure of the vehicle speed sensor have been proposed in order to avoid applying a greater assist torque at the time of failure of the vehicle speed sensor.

The methods for determining failure of the vehicle speed sensor are given below. In a first failure determination method, two vehicle speed sensors are employed and each sensor detects the vehicle speed, so that failure of the vehicle speed sensor is detected based on the comparison between the two vehicle speeds detected. In a second failure determination method, the vehicle speed detected by the vehicle speed sensor and the engine rotational speed detected by the engine rotational speed sensor are compared to each other so as to determine failure of the vehicle speed sensor. Japanese Laid-open Patent Publication Hei.3-114974 discloses a method for determining failure of the vehicle speed sensor in a four-wheel steering apparatus. According to a third failure determination method in this four-wheel steering apparatus, the vehicle speed sensor is determined as failure in the case that the vehicle speed detected by the vehicle speed sensor is 0 km/h, that the output of the engine is capable of moving the vehicle (in the preferred embodiment, it is determined by the engine rotational speed to be detected by the engine rotational speed detecting means), and that the shift range detected by the driving range detecting means is in a driving range.

However, the first failure determination method requires two vehicle sensors, which leads to increased cost. In the second failure determination method, if the driver races (viz. idly blows) the engine while the vehicle is parked, the vehicle speed is 0 km/h notwithstanding that the engine rotational speed is equal to or greater than a predetermined rotational speed (rpm) and therefore the vehicle speed sensor is determined as failure. Especially in the case of a hybrid vehicle provided with an engine and an electric motor, because racing frequency becomes higher to charge the onboard battery, a determination error occurs frequently. In the third failure determination method, failure is determined only when the shift range is set in a driving range, and therefore, the vehicle speed sensor cannot be determined as failure when the driver races the engine while the vehicle is parked (with the shift range set in a non-driving range). However, in this third failure determination method, a determination error may arise to determine failure of the vehicle sensor at the time of abrupt starting because the shift range is set in a driving range and the engine rotational speed may be equal to or greater than a predetermined rotational speed notwithstanding that the actual vehicle speed is 0 km/h or substantially 0 km/h (the vehicle speed sensor detects the vehicle speed as 0 km/h). Moreover, in the third failure determination method, if the driving range detecting means malfunctions, it is impossible to determine failure of the vehicle speed sensor because the driving range detecting means is always off and indicates that the shift range is set in a non-driving range.

Accordingly, it is an object of the present invention to provide an electric power steering apparatus which is capable of highly accurately determining failure of the vehicle speed sensor without errors.

SUMMARY OF THE INVENTION

According to a first aspect of the present invention, there is provided an electric power steering apparatus comprising:

an electric motor applying an assist torque to a steering system;

a vehicle speed detecting section detecting a vehicle speed of the vehicle;

a shifting state detecting section detecting a shifting state of the vehicle;

an engine rotational speed detecting section detecting an engine rotational speed; and a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section, the shifting state detected by the shifting state detecting section, and the engine rotational speed detected by the engine rotational speed detecting section, and wherein the failure determination section determines that the vehicle speed detecting section malfunctions if the engine rotational speed is equal to or greater than a predetermined rotational speed for a determinative continuous-time and/or a first determinative integrated time while the vehicle speed is zero and the shifting state is a vehicle driving state.

With such a constitution of the electric power steering apparatus, the failure determination section determines that the vehicle speed detecting section malfunctions, if the vehicle speed detecting section detects the vehicle speed of zero on condition that while the shifting state is a vehicle driving state, the engine rotational speed is equal to or greater than the predetermined rotational speed wherein the expected vehicle speed is greater than zero (viz. the actual vehicle speed of the vehicle would no be zero), and if such a condition continues for the determinative continuous-time and/or the first determinative integrated time. By this determination, it is possible to eliminate a determination error such that the vehicle speed detecting section is determined falsely as failure, even in the case of abrupt starting. This is because the determination conditions consider the determinative continuous-time and/or the first determinative integrated time as sufficiently long time for which the vehicle speed detected by the vehicle speed detecting section after abrupt starting would be greater than zero.

In this electric power steering apparatus, since the determination of failure of the vehicle speed detecting section concerns the vehicle speed, the engine rotational speed and the shifting state as determination factors, and further concerns the determinative continuous-time and/or the first determinative integrated time as determination conditions, it is possible to eliminate a determination error even in the case of abrupt starting. Therefore, the electric power steering apparatus ensures highly accurate determination of failure of the vehicle speed detecting section.

According to a second aspect of the present invention, there is provided an electric power steering apparatus comprising:

an electric motor applying an assist torque to a steering system;

a vehicle speed detecting section detecting a vehicle speed of the vehicle;

a shifting state detecting section detecting a shifting state of the vehicle;

an engine rotational speed detecting section detecting an engine rotational speed; and a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section, the shifting state detected by the shifting state detecting section, and the engine rotational speed detected by the engine rotational speed detecting section, and wherein the failure determination section determines that the vehicle speed detecting section malfunctions if the engine rotational speed is equal to or greater than a predetermined rotational speed for a second determinative integrated time while the vehicle speed is zero and the shifting state is not a vehicle driving state.

With such a constitution of the electric power steering apparatus, the failure determination section determines that the vehicle speed detecting section malfunctions, if the engine rotational speed is equal to or greater than the predetermined rotational speed wherein the expected vehicle speed is greater than zero (viz. the vehicle would be actually moving), and if such a condition continues for the second determinative integrated time while the shifting state detected by the shifting state detecting section is not a vehicle driving state and the vehicle speed detecting section detects the vehicles speed of zero. By this determination, failure of the vehicle speed detecting section will be determined even if the shifting state detecting section malfunctions. Furthermore, even if the driver races the engine, it is possible to eliminate a determination error such that the vehicle speed detecting section is determined falsely as failure. This is because the determination condition considers the second determinative integrated time wherein the driver usually would not race the engine for such a long time.

In this electric power steering apparatus, since the determination of failure of the vehicle speed detecting section concerns the vehicle speed, the engine rotational speed and the shifting state as determination factors, and further concerns the second determinative integrated time as a determination condition, it is possible to determine failure of the vehicle speed detecting section even if the shifting state detecting section malfunctions, and further it is possible to eliminate a determination error even if the driver races the engine. Therefore, the electric power steering apparatus ensures highly accurate determination of failure of the vehicle speed detecting section.

In the aforementioned electric power steering apparatus, the shifting state detecting section may be incorporated in an engine control section, and the engine control section inputs a shifting state signal to the motor control section.

With such a constitution of the electric power steering apparatus, the shifting state detecting section is provided in the engine control section into which a signal of the shifting state is inputted, and the shifting state is determined by the shifting state signal from the engine control section. Accordingly, the electric power steering apparatus determines the shifting state with a simple constitution.

In this electric power steering apparatus, since the shifting state detecting section is incorporated in the engine control section, it is possible to simplify the construction and to thereby reduce the cost.

According to a third aspect of the present invention, there is provided an electric power steering apparatus comprising:

an electric motor applying an assist torque to a steering system;

a vehicle speed detecting section detecting a vehicle speed of the vehicle;

an engine rotational speed detecting section detecting an engine rotational speed; and a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section and the engine rotational speed detected by the engine rotational speed detecting section; and a racing detecting section detecting a racing state of the vehicle, wherein the failure determination section determines that the vehicle speed detecting section malfunctions if the racing detecting section detects a non-racing state while the vehicle speed is zero and the engine rotational speed is equal to or greater than a predetermined rotational speed.

With such a constitution of the electric power steering apparatus, the failure determination section determines that the vehicle speed detecting section malfunctions, if the vehicle speed detecting section detects the vehicle speed of zero on condition that the engine rotational speed is equal to or greater than the predetermined rotational speed wherein the expected vehicle speed is greater than zero (viz. the vehicle would be actually moving) while the driver is not racing the engine. By this determination, since the racing is detected, it is possible to eliminate a determination error such that the vehicle speed detecting section is determined falsely as failure, even if the driver races the engine.

In this electric power steering apparatus, since the determination of failure of the vehicle speed detecting section concerns the vehicle speed, the engine rotational speed and the racing state as determination factors, it is possible to eliminate a determination error even if the driver races the engine. Therefore, the electric power steering apparatus ensures highly accurate determination of failure of the vehicle speed detecting section.

In the aforementioned electric power steering apparatus, the failure determination section may determine that the vehicle speed detecting section malfunctions if the racing detecting section detects a non-racing state for a determinative continuous-time and/or a first determinative integrated time while the vehicle speed is zero and the engine rotational speed is equal to or greater than a predetermined rotational speed.

With such a constitution of the electric power steering apparatus, the failure determination section determines that the vehicle speed detecting section malfunctions, if the vehicle speed detecting section detects the vehicle speed of zero on condition that an engine rotational speed is equal to or greater than the predetermined rotational speed wherein the expected vehicle speed is greater than zero (viz. the actual vehicle speed of the vehicle would no be not zero), and if such a condition continues for the determinative continuous-time and/or the first determinative integrated time while the driver is not racing the engine. By this determination, it is possible to eliminate a determination error such that the vehicle speed detecting section is determined falsely as failure, even in the case of abrupt starting. This is because the determination conditions consider the determinative continuous-time and/or the first determinative integrated time as sufficiently long time for which the vehicle speed detected by the vehicle speed detecting section after abrupt starting would be greater than zero.

In this electric power steering apparatus, since the determination of failure of the vehicle speed detecting section concerns the vehicle speed, the engine rotational speed and the racing state as determination factors, and further concerns the determinative continuous-time and/or the first determinative integrated time as determination conditions, it is possible to eliminate a determination error even in the case of abrupt starting. Therefore, the electric power steering apparatus ensures highly accurate determination of failure of the vehicle speed detecting section.

Further, in the aforementioned electric power steering apparatus, the racing detecting section may be incorporated in an engine control section, and the engine control section inputs a racing state signal to the motor control section.

With such a constitution of the electric power steering apparatus, the racing detecting section may be provided in the engine control section into which a signal of the racing state is inputted, and the racing state is determined by the racing state signal from the engine control section. Accordingly, the electric power steering apparatus determines the racing state with a simple constitution.

In this electric power steering apparatus, since the racing detecting section is incorporated in the engine control section, it is possible to simplify the construction and to thereby reduce the cost.

The wording "vehicle speed is zero" indicates that the vehicle speed detected by the vehicle speed detecting section is zero. Therefore, even if the vehicle actually moves at an extremely low speed, as long as the vehicle speed detecting section detects the vehicle speed of zero due to the detection accuracy, the vehicle speed is regarded as zero. The wording "shifting state is a vehicle driving state" indicates that the shift range positions in a state where the vehicle is movable, and in the case of an manual transmission vehicle, the clutch pedal is not depressed and any one of transmission gears is set in, and in the case of an automatic transmission vehicle, a driving range such as a drive range, a low range or a reverse range is set in. Furthermore, the wording "shifting state is not a vehicle driving state" indicates that the shift range positions in a state where the vehicle is not movable, and in the case of an manual transmission vehicle, a neutral range is set in or the clutch pedal is depressed, and in the case of an automatic transmission vehicle, a neutral range or a parking range is set in. Furthermore, the wording "a predetermined rotational speed" indicates an engine rotational speed which inevitably makes the vehicle speed greater than zero (viz. the vehicle speed sensor inevitably detects the vehicle speed greater than zero) when the shifting state is a vehicle driving state, and the optimum value is set as a predetermined rotational speed in accordance with a kind of engine, idling engine rotational speed, etc. The wording "determinative continuous-time" indicates sufficient time, even in the case of abrupt starting, for the vehicle speed detecting section to detect the vehicle speed greater than zero after the engine rotational speed reaches the predetermined rotational speed. The determinative continuous-time is set as a continuous time. The wording "first determinative integrated time" indicates sufficient time, even in the case of abrupt starting, for the vehicle speed detecting section to detect the vehicle speed greater than zero after the engine rotational speed reaches the predetermined rotational speed. The first determinative integrated time is set as an integrated or accumulated time. Furthermore, the wording "second determinative integrated time" indicates sufficiently long time wherein the driver usually would not race the engine for such a long time. The second determinative integrated time is set as an integrated or accumulated time.

BRIEF DESCRIPTION OF THE DRAWINGS

Preferred embodiments of the present invention will be described below, by way of example only, with reference to the accompanying drawing, in which:

FIGS. 3A and 3B are explanatory views of a shifting state detecting section according to a first embodiment of the invention, in which FIG. 3A shows the hardware configuration, and FIG. 3B is a setting table showing signal values of shifting state signals;

FIGS. 4A and 4B are explanatory views of a shifting state detecting section according to a second embodiment of the invention, in which FIG. 4A shows the hardware configuration, and FIG. 4B is a setting table showing signal values of shifting state signals;

DESCRIPTION OF THE PREFERRED EMBODIMENTS

With reference to the drawings, an electric power steering apparatus according to the present invention will be described.

In order to determine failure of a vehicle speed detecting section highly accurately, the electric power steering apparatus concerns determination factors such as a vehicle speed detected by the vehicle speed detecting section, an engine rotational speed detected by an engine rotational speed detecting section, and a shifting state detected by a shifting state detecting section, and determination conditions such as a determinative continuous-time and/or a first determinative integrated time or a second determinative integrated time. Furthermore, in order to determine failure of the vehicle speed detecting section highly accurately, the electric power steering apparatus concerns determination factors such as a vehicle speed detected by the vehicle speed detecting section, an engine rotational speed detected by the engine rotational speed detecting section, and a racing state detected by a racing detecting section.

For the purpose of detecting failure of a vehicle speed sensor (vehicle speed detecting section), the electric power steering apparatus is constituted such that a controller is provided with a vehicle speed sensor failure determination section (failure determination section) and an engine rotational speed sensor (engine rotational speed detecting section) and an engine controller are provided with a shifting state detecting section or a racing detecting section. In the preferred embodiments, the controller (vehicle speed sensor failure determination section) is explained for three embodiments, where the first embodiment relates to a shifting state detecting section for an automatic transmission vehicle, the second embodiment relates to a shifting state detecting section for a manual transmission vehicle, and the third embodiment relates to a racing detecting section.

Figure 1:
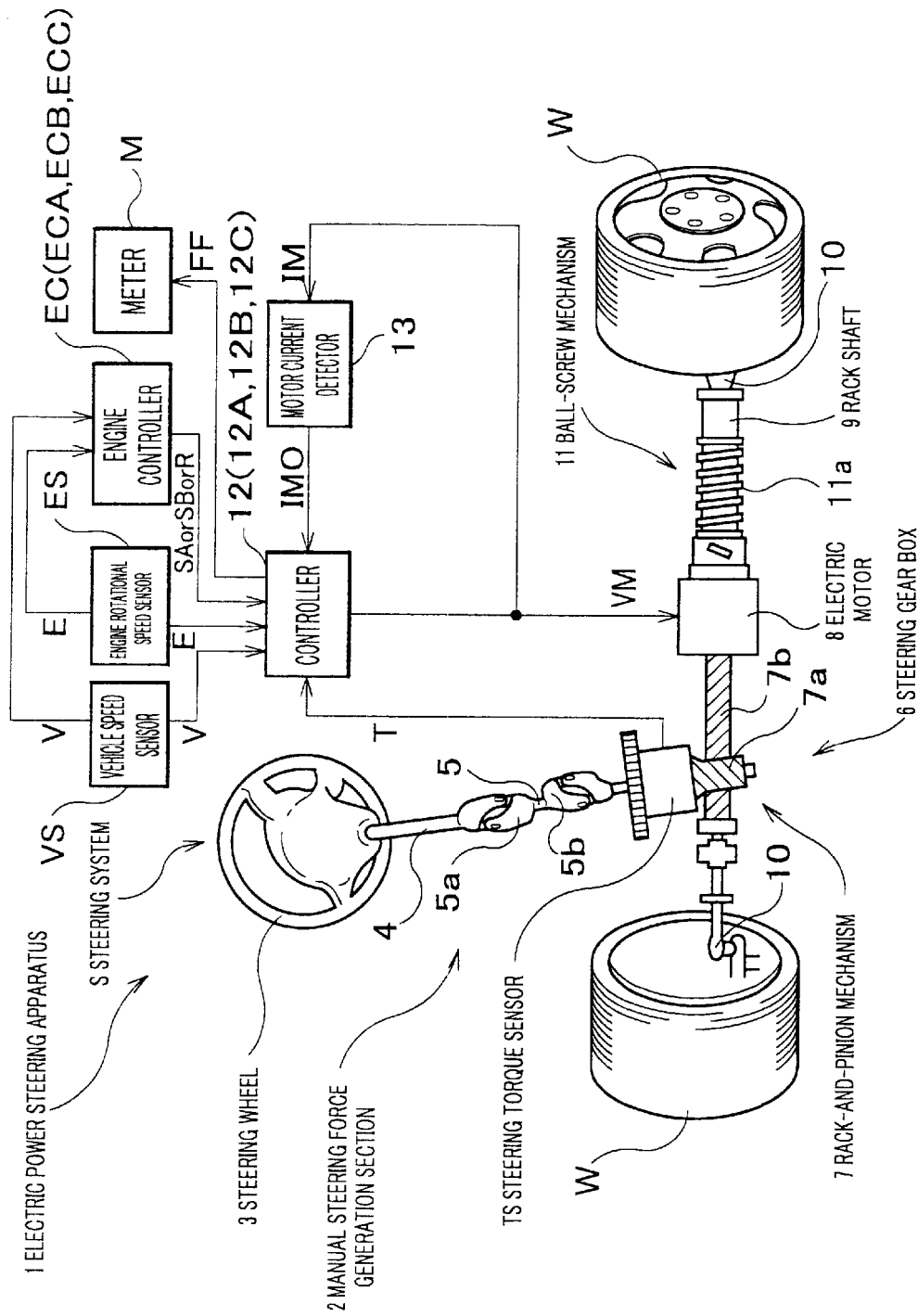
FIG. 1 illustrates the overall arrangement of an electric power steering apparatus according to the present invention.

The overall arrangement of the electric power steering apparatus 1 will be described with reference to FIG. 1.

The electric power steering apparatus 1 is provided in a steering system S from a steering wheel 3 to steerable wheels W, and assists steering effort generated at a manual steering force generation section 2. To this end, the electric power steering apparatus 1 generates motor voltage VM at the controller 12 so that an electric motor 8 is driven with the motor voltage VM to generate an assist torque (assist steering force) whereby a manual steering force at the manual steering force generation section 2 is eased.

In the preferred embodiments, the controller 12 is corresponding to a motor control section defined in the claims.

The manual steering force generation section 2 is formed in such a manner that a steering shaft 4 integral with a steering wheel 3 is connected via a connecting shaft 5 to a pinion 7a of a rack-and-pinion mechanism 7 positioned in a steering gear box 6. The connecting shaft 5 is provided with universal joints 5a, 5b at both ends thereof. The rack-and-pinion mechanism 7 consists of a pinion 7a and rack teeth 7b formed on a rack shaft 9 and meshing with the pinion 7a, and converts a rotational movement of the pinion 7a into a reciprocating movement along the rack shaft 9 (in the transverse direction of the vehicle) by the meshing engagement between the pinion 7a and the rack teeth 7b. Furthermore, right and left front wheels W as steerable wheels are connected at both ends of the rack shaft 9 via tie rods 10.

The electric motor 8 is coaxially positioned on the rack shaft 9 for the purpose of generating an assist steering force (assist torque). The electric power steering apparatus 1 converts a rotation of the electric motor 8 into a thrust force via a ball-screw mechanism 11 coaxial with the rack shaft 9, and applies the thus converted thrust force to the rack shaft 9 (ball-screw shaft 11a).

Various detection signals V, T, IMO from a vehicle speed sensor VS, a steering torque sensor TS, and a motor current detector 13 are inputted into the controller 12. The controller 12 then determines the magnitude and the direction of a motor current IM flowing to the electric motor 8 on the basis of the detection signals V, T, IMO, and outputs a motor control signal VO to a motor drive circuit 25 (see FIG. 2). Furthermore, on the basis of the motor control signal VO, the controller 12 applies a motor voltage VM from the motor drive circuit 25 to the electric motor 8 (see FIG. 2).

In the preferred embodiments, the vehicle speed sensor VS is corresponding to a vehicle speed detecting section defined in the claims.

Figure 3:
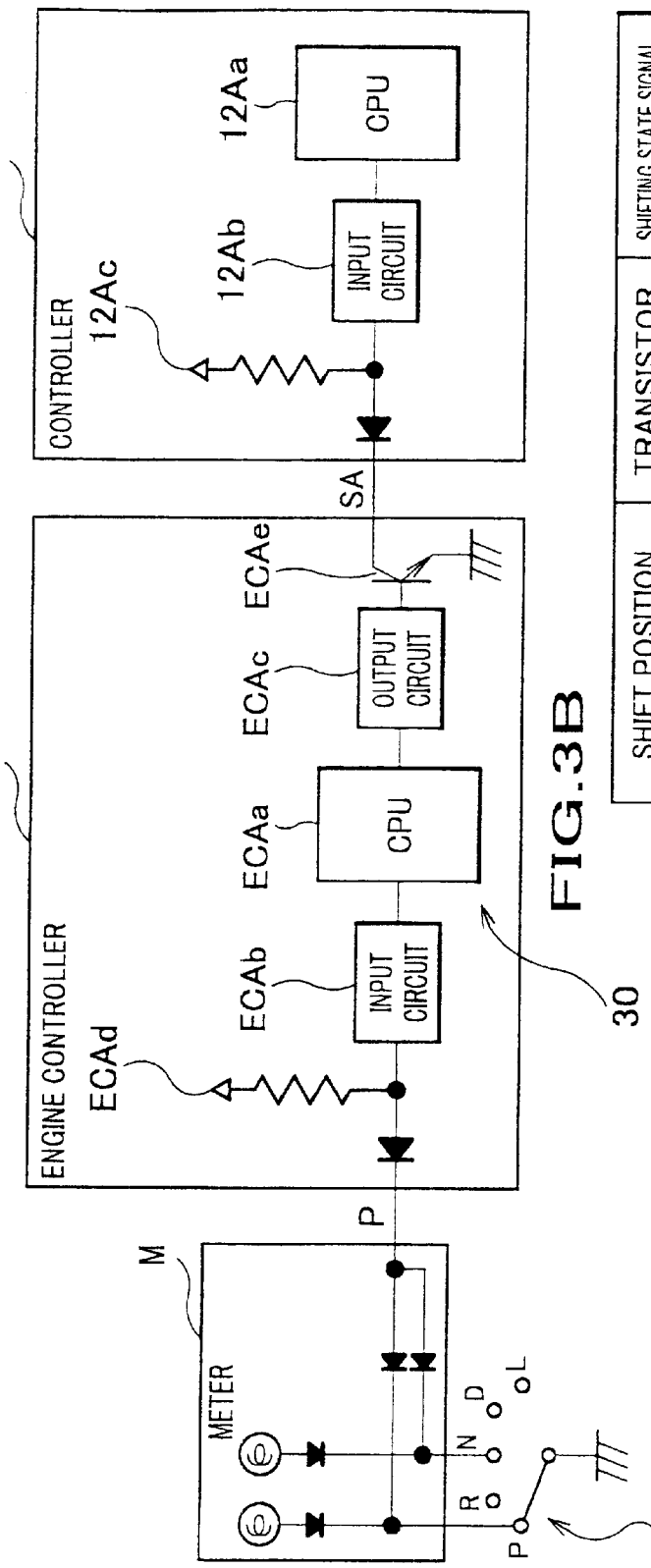
Figure 4:
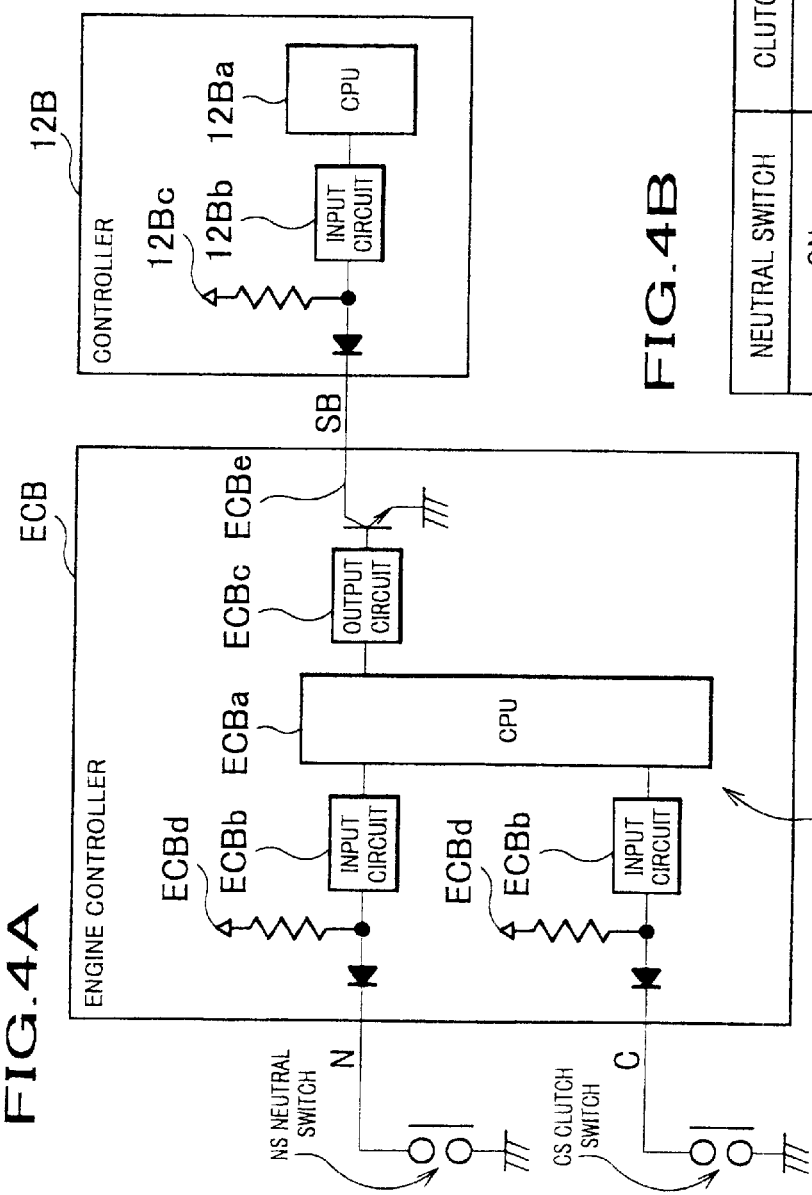

Detection signals V, E from the vehicle speed sensor VS and the engine rotational speed sensor ES and a shifting state signal SA, SB or a racing state signal R from the engine controller ECA, ECB or ECC are inputted into the controller 12A, 12B and 12C. The controller 12A, 12B and 12C determines whether the vehicle speed sensor VS malfunctions on the basis of the detection signals V, E and the signal SA, SB or R, and carries out a fade processing in the case of determination of failure of the vehicle speed sensor VS. Furthermore, the controller 12A, 12B and 12C outputs a failure determination signal FF, which indicates whether the vehicle speed sensor VS malfunctions, to a meter M. As shown in FIG. 3A, the engine controller ECA according to the first embodiment is provided with a shifting state detecting section 30. As shown in FIG. 4A, the engine controller ECB according to the second embodiment is provided with a shifting state detecting section 40. Furthermore, the engine controller ECC according to the third embodiment is provided with a racing detecting section (not shown).

In the preferred embodiments, the engine rotational speed sensor ES is corresponding to an engine rotational speed detecting section defined in the claims.

The vehicle speed sensor VS detects vehicle speed as the number of pulse per unit time, and transmits the detected pulse signal to the controller 12 and the engine controller EC as a vehicle speed signal V. The vehicle speed sensor VS always transmits a vehicle speed signal V indicating a vehicle speed of 0 km/h at the time of failure. The vehicle speed sensor VS may be an exclusive sensor for the electric power steering apparatus 1. However, vehicle speed sensors in other system may be used.

The steering torque sensor TS is positioned in the steering gear box 6, and detects the magnitude and the direction of a manual steering torque inputted by the driver. The steering torque sensor TS transmits an analog electric signal associating with the detected steering torque to the controller 12 as a steering torque signal T. The steering torque signal T includes information with regard to the steering torque indicating the magnitude and the torque direction indicating the direction of the torque. The torque direction is shown by plus/minus value, and the steering torque direction points to the right when the value takes a plus value, and the steering torque direction points to the left when the value takes a minus value.

The engine rotational speed sensor ES detects a rotation angle of the crankshaft of the engine, and transmits an analog electric signal associating with the detected pulse signal to the controller 12 and the engine controller EC as an engine rotational speed signal E.

The motor current detector 13 is provided with resistances or Hall elements connected in series with regard to the electric motor 8, and detects the magnitude and the direction of a motor current IM that is actually flowing into the electric motor 8. The motor current detector 13 feeds a motor current signal IMO associating with the motor current IM back to the controller 12 (negative feedback). The motor current signal IMO includes information with regard to the motor current value indicating the magnitude and the current direction indicating the direction of the motor current (direction of the auxiliary assistance). The current direction is shown by plus/minus value of the motor current value, and the direction of the auxiliary assistance points to the right when the value takes a plus value, and the direction of the auxiliary assistance points to the left when the value takes a minus value.

The constitution of the controller 12 will be described in greater detail. In accordance with the three embodiments, the controller 12 has three different types controllers 12A, 12B and 12C. Each of the controllers 12A, 12B and 12C will be described below. Furthermore, three engine controllers ECA, ECB and ECC are employed in accordance with the three controllers 12A, 12B and 12C, and a shifting state detecting section or a racing detecting section provided in these engine controllers ECA, ECB and ECC will be described in detail.

Figure 2:
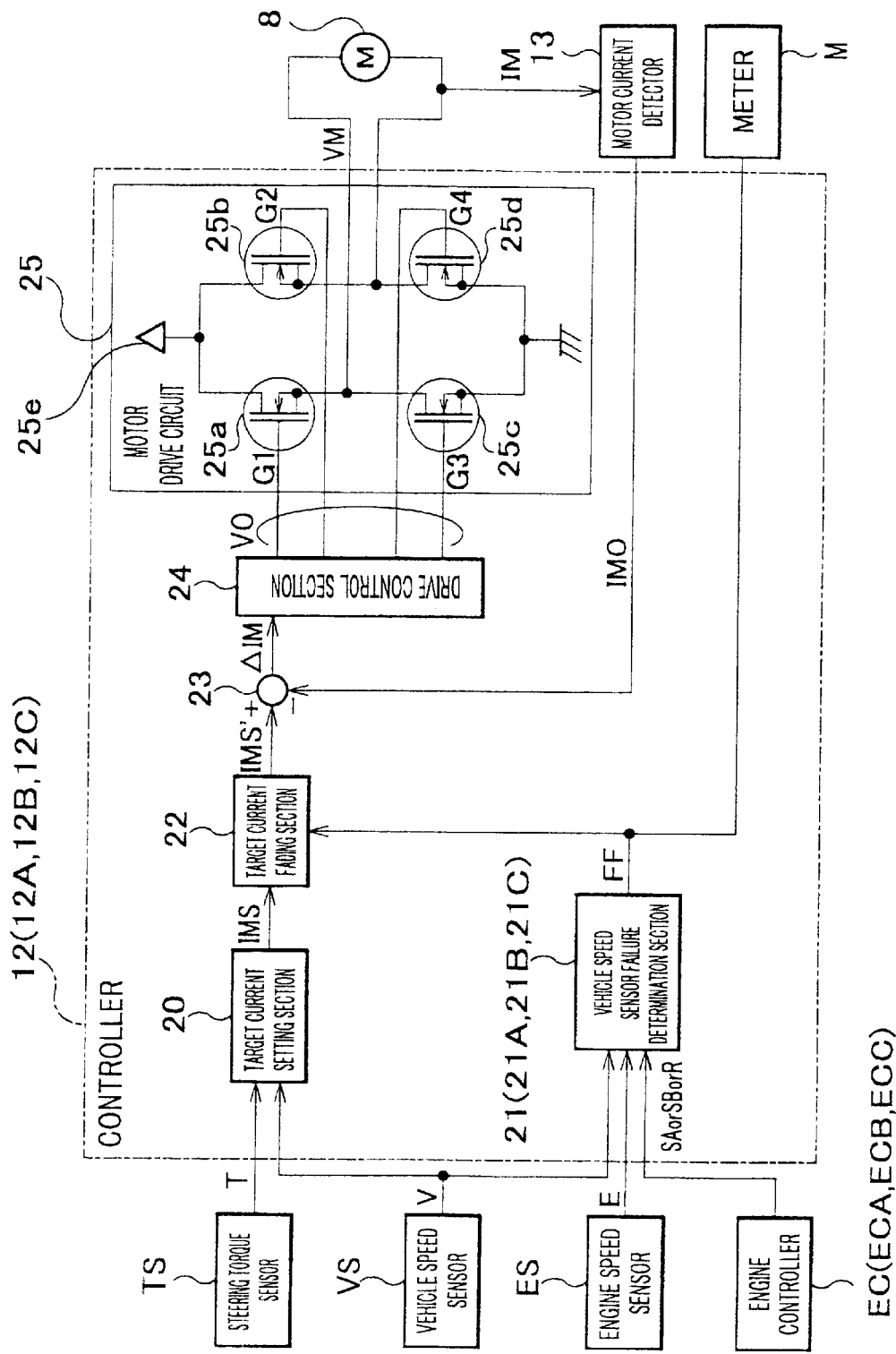
FIG. 2 is a block diagram illustrating a controller according to the present invention.

With reference to FIGS. 2, 3A and 3B, the shifting state detecting section 30 in the controller 12A and the engine controller ECA according to the first embodiment will be described. FIG. 2 is a block diagram illustrating the controller. FIGS. 3A and 3B are explanatory views of a shifting state detecting section according to the first embodiment of the invention, in which FIG. 3A shows the hardware configuration, and FIG. 3B is a setting table showing signal values of shifting state signals.

The shifting state detecting section 30 in the engine controller ECA will be described. The engine controller ECA detects whether the shifting state is a vehicle driving state or a vehicle non-driving state because a detection signal from a shift position sensor SS that is required in terms of control is inputted through the meter M. According to this embodiment, for the purpose of simplifying the constitution of the electric power steering apparatus, the shifting state detecting section 30 is incorporated in the engine controller ECA, and the shifting state signal SA is transmitted from the engine controller ECA into the controller 12A. Therefore, the shifting state detecting section 30 is incorporated in the engine controller ECA, however, it is incorporated in the electric power steering apparatus 1.

The engine controller ECA is furnished in an automatic transmission vehicle, and wholly controls the engine based on the control of fuel injection, ignition timing, idling engine rotational speed, etc. For this reason, the engine controller ECA comprises a CPU (Central Processing Unit) ECAa for processing various kinds of calculations or operations, an input circuit ECAb, an output circuit ECAc, a memory (not shown), a power circuit (not shown), etc.

The shifting state detecting section 30 is incorporated in the CPU ECAa. A shift position signal P is inputted into the shifting state detecting section 30 from the meter M through the input circuit ECAb, and the shifting state detecting section 30 outputs a shifting state signal SA through the output circuit ECAc into the controller 12A. The shifting state detecting section 30 detects whether the shifting state is a vehicle non-driving state (viz. a neutral range or a parking range) or a vehicle driving state (viz. a drive range, a low range or a reverse range) on the basis of the shift position signal P.

A description will now be given of the shift position signal P. The shift position sensor SS is a sensor for detecting the shift position, and transmits a detection signal to the meter M. The detection signal of the shift position sensor SS indicates a signal showing ground connection in the case that the shift position is in a vehicle non-driving state such as a neutral range and a parking range, and indicates a signal showing open in the case that the shift position is in a vehicle driving state such as a drive range, a low range and a reverse range. In the engine controller ECA, the shift position signal P associating with the detection signal from the shift position sensor SS is inputted from the meter P. When the shift position is in a vehicle non-driving state, the shift position signal P provides a LOW signal based on the detection signal (ground connection) of the shift position sensor SS. Meanwhile, when the shift position is in a vehicle driving state, the shift position signal provides a HI signal based on the detection signal (open) of the shift position sensor SS and a constant-voltage power supply (5V) ECAd.

When the shift position signal P is a LOW signal (viz. when the shift position is in the neutral range or the parking range), the shifting state detecting section 30 determines that the shifting state is a vehicle non-driving state, and transmits a signal to the output circuit ECAc to make a transistor ECAe on. On the other hand, when the shift position signal P is a HI signal (viz. when the shift position is in the drive range, the low range or the reverse range), the shifting state detecting section 30 determines that the shifting state is a vehicle driving state, and transmits a signal to the output circuit ECAc to make a transistor ECAe off.

Accordingly, when the shift position is in the neutral range or the parking range (viz. when the shifting state is a vehicle non-driving state), the transistor ECAe at the output end of the engine controller ECA is on, whereby the shifting state signal SA becomes a LOW signal. Meanwhile, when the shift position is in the drive range, the low range or the parking range (viz. when the shifting state is a vehicle driving state), the transistor ECAe at the output end of the engine controller ECA is off, whereby the shifting state signal SA becomes a HI signal by the constant-voltage power supply (5V) 12 Ac.

The controller 12A will be described in detail. The controller 12A mainly comprises a target current setting section 20, a vehicle speed sensor failure determination section 21A, a target current fading section 22, a deviation calculating section 23, a drive control section 24, and a motor drive circuit 25. The controller 12A is provided with a CPU 12Aa for processing various kinds of calculations or operations, an input circuit 12Ab, an output circuit (not shown), a memory (not shown) such as ROM (Read Only Memory), a power circuit (not shown), etc.

In the first embodiment, the vehicle speed sensor failure determination section 21A is corresponding to a failure determination section defined in the claims.

A description will be given of the target current setting section 20. The steering torque signal T from the steering torque sensor TS and the vehicle speed signal V from the vehicle speed sensor VS are inputted into the target current setting section 20, and the target current setting section 20 outputs the target current signal IMS to the target current fading section 22. The target current setting section 20 searches a map of steering torque signal T and vehicle speed signal V regarding target current signal IMS with the use of the steering torque signal T and the vehicle speed signal V as an address, the map of which is set based on previous experimental values or design values, and then reads out a corresponding target current signal IMS. The target current signal IMS provides a large value with respect to the vehicle speed signal V when the vehicle speed signal V indicates a lower speed having a greater road reaction force, and provides a small value for a higher vehicle speed so as to ensure driving stability. The target current signal IMS provides zero with respect to the steering torque signal T when the steering torque signal T is proximate to zero, and in the region where the steering torque signal T is equal to or greater than a predetermined value, the target current signal IMS increases as the steering torque signal T increases. Since the maximum current that is allowed to flow into the electric motor 8 is defined, the target current signal IMS is set below the maximum current.

A description will be given of the vehicle speed sensor failure determination section 21A. The vehicle speed signal V from the vehicle speed sensor VS, the engine rotational speed signal E from the engine rotational speed sensor ES, and the shifting state signal SA from the engine controller ECA are inputted into the vehicle speed sensor failure determination section 21A, the vehicle speed sensor failure determination section 21A outputs the failure determination signal FF into the target current fading section 22. The vehicle speed sensor failure determination section 21A determines whether the vehicle speed sensor VS malfunctions on the basis of the vehicle speed signal V, the engine rotational speed signal E, and the shifting state signal SA, and sets the failure determination signal FF to a HI signal in the case of determination of failure of the vehicle speed sensor VS and to a LOW signal in the case of determination of normal of the vehicle speed sensor VS. The failure determination signal FF is transmitted to the meter M so that a warning lamp for the electric power steering apparatus 1 is lit on the meter M when the failure determination signal FF is a HI signal and the warning lamp is off when the failure determination signal FF is a LOW signal.

The vehicle speed sensor failure determination section 21A determines whether or not the vehicle speed is 0 km/h on the basis of the vehicle speed signal V, and provides a LOW signal to the failure determination signal FF when the vehicle speed is greater than 0 km/h. Since the vehicle speed sensor VS always outputs the vehicle speed signal V indicating 0 km/h at the time of failure, if the outputted vehicle speed signal V indicates the vehicle speed of greater than 0 km/h, it is possible to consider that the vehicle speed sensor VS is normal.

Furthermore, the vehicles speed sensor failure determination section 21A determines whether the shifting state is a vehicle driving state or a vehicle non-driving state on the basis of the shifting state signal SA. Specifically, the vehicle speed sensor failure determination section 21A determines as being the vehicle non-driving state when the shifting state signal SA is a LOW signal, and it determines as being the vehicle driving state when the shifting state signal SA is a HI signal.

When the shifting state is a vehicle driving state, the vehicle speed sensor failure determination section 21A determines whether the engine rotational speed is equal to or greater than a determinative rotational speed on the basis of the engine rotational speed signal E, and thereafter sets a LOW signal as the failure determination signal if the engine rotational speed is less than the determinative rotational speed. The reason why the vehicle speed sensor VS is not determined as failure when the engine rotational speed is less than the determinative rotational speed is that since the actual vehicle speed would be zero or extremely low speed in this engine rotational speed, there may be a possibility that the vehicle speed of 0 km/h is detected. The determinative rotational speed is such an engine rotational speed that the vehicle speed sensor VS inevitably detects the vehicle speed of greater than 0 km/h when the shifting state is a vehicle driving state. The determinative rotational speed is set in the range of between 1500 to 2000 rpm in consideration of a kind of engine and idling engine rotational speed.

In the preferred embodiments, the determinative rotational speed is corresponding to a predetermined rotational speed defined in the claims.

When the engine rotational speed is equal to or greater than the determinative rotational speed, the vehicle speed sensor failure determination section 21A starts to count a continuous-time. The vehicle speed sensor failure determination section 21A determines whether the continuous-time presently counting reaches a determinative continuous-time, and sets a LOW signal as the failure determination signal if the vehicle speed becomes greater than 0 km/h before the continuous-time reaches the determinative continuous-time, if the shifting state is turned to a vehicle non-driving state, or if the engine rotational speed becomes less than the determinative rotational speed. The reason why the vehicle speed sensor VS is not determined as failure as long as the continuous-time does not reach the determinative continuous-time is that the vehicle speed sensor VS may detect the vehicle speed of 0 km/h for a few seconds in the case of abrupt starting and the like. Furthermore, the reason why the continuous-time is considered as a determination condition is to eliminate a determination error at the time of abrupt starting with the greatest possible care. The determinative continuous-time is sufficient time, even in the case of abrupt starting, for the vehicle speed sensor VS to detect the vehicle speed of greater than 0 km/h after the engine rotational speed reaches to the determinative rotational speed, and for example, several tens of seconds is set.

When the continuous-time reaches the determinative continuous-time, the vehicle speed sensor failure determination section 21A starts to count an integrated time. The vehicle speed sensor failure determination section 21A determines whether or not the integrated time presently counting reaches a first determinative integrated time, and sets a LOW signal as the failure determination signal if the vehicle speed becomes greater than 0 km/h before the integrated time reaches the first determinative integrated time or if the shifting state is turned to a vehicle non-driving state. The reason why the integrated time is also considered as a determination condition is to eliminate a determination error at the time of abrupt starting with great reliability and to determine failure of the vehicle speed sensor VS accurately. The first determinative integrated time is sufficient time, even in the case of abrupt starting, for the vehicle speed sensor VS to detect the vehicle speed of greater than 0 km/h after the engine rotational speed reaches the determinative rotational speed, and for example, several tens of seconds is set.

When the integrated time reaches the first determinative integrated time, the vehicle speed sensor failure determination section 21A determines failure of the vehicle speed sensor VS, and sets a HI signal as the failure determination signal FF.

Meanwhile, when the shifting state is a vehicle non-driving state, the vehicle speed sensor failure determination section 21A determines whether the engine rotational speed is equal to or greater than the determinative rotational speed on the basis of the engine rotational speed signal E, and thereafter sets a LOW signal as the failure determination signal if the engine rotational speed is less than the determinative rotational speed.

When the engine rotational speed is equal to or greater than the determinative rotational speed, the vehicle speed sensor failure determination section 21A starts to count an integrated time. The vehicle speed sensor failure determination section 21A determines whether or not the integrated time presently counting reaches a second determinative integrated time, and sets the failure determination signal to a LOW signal if the vehicle speed becomes greater than 0 km/h before the integrated time reaches the second determinative integrated time or if the shifting state is turned to a vehicle non-driving state. The reason why the vehicle speed sensor VS is not determined as failure when the integrated time is equal to or greater than the second determinative integrated time is that the driver may race the engine for several tens of seconds. Furthermore, the reason why the integrated time is considered as a determination condition is that the determination condition will be hardly satisfied with continuous-time. That is, the driver usually does not race the engine continuously for several hundreds of seconds. The second determinative integrated time is such a long time that the driver usually would not race the engine for such a long time, and for example, several hundreds of seconds is set.

When the integrated time reaches the second determinative integrated time, the vehicle speed sensor failure determination section 12A determines failure of the vehicle speed sensor VS, and sets a HI signal as the failure determination signal.

A description will be given of the target current fading section 22. The target current signal IMS from the target current setting section 20 and the failure determination signal FF from the vehicle speed sensor failure determination section 21A are inputted into the target current fading section 22, and the target current setting fading section 22 outputs the target current signal IMS' to the deviation calculating section 23. The target current fading section 22 sets the target current signal IMS', if the vehicle speed sensor VS is determined as failure, the value of which decreases gradually as the passage of time and finally becomes zero. This is because if the target current signal IMS' is instantly turned to zero while the vehicle speed sensor VS malfunctions, the steering wheel 3 abruptly becomes heavy by the result of the instantly lost assist torque. For this reason, the target current signal IMS' is faded by the target current fading section 22 to decrease the assist torque gradually, thereby preventing the drawback that the steering wheel 3 instantly becomes heavy, as well as notifying the driver through the gradually increasing feel of the steering wheel 3 that the electric power steering apparatus 1 malfunctions.

Specifically, the target current fading section 22 sets the target current signal IMS as IMS' when the failure determination signal FF is a LOW signal. Meanwhile, when the failure determination signal FF is a HI signal, the target current fading section 22 sets the target current signal IMS' by way of converting the target current signal IMS in accordance with a fade map. The fade map is a map for gradually decreasing the target current signal IMS to a smaller value as the passage of time, and for example, the value of 0.9 times of the target current signal IMS at one minute after the failure determination signal FF is turned to a HI signal, the value of 0.8 times of the target current signal IMS at two minutes later, and finally the target current signal IMS is converted into zero. However, instead of decreasing the target current signal IMS' finally to zero, it is possible to set the target current signal IMS' finally to a small value which generates a minimum assist torque to assist the driver's steering effort.

A description will be given of the deviation calculating section 23. The target current signal IMS' from the target current fading section 22 and the motor current signal IMO from the motor current detector 13 are inputted into the deviation calculating section 23, the deviation calculating section 23 outputs a deviation signal ΔIM to the drive control section 24. The deviation calculating section 23 calculates the deviation signal ΔIM (=IMS'−IMO) by subtracting the motor current signal IMO from the target current signal IMS'.

The deviation signal ΔIM from the deviation calculating section 23 is inputted into the drive control section 24, and the drive control section 24 outputs a motor control signal VO to the motor drive circuit 25. To this end, the drive control section 24 is furnished with a PI (Proportional Integral) controller, a PWM (Pulse Width Modulation) signal producing section, etc. The drive control section 24 processes a P (proportion) control and an I (integration) control on the deviation signal ΔIM, and produces a PI control signal indicating the direction and the current value of the motor current IM, which is supplied to the electric motor 8 to make the deviation approximate to zero. Subsequently, the drive control section 24 produces, based on the PI control signal, a PWM signal, an ON signal and an OFF signal associating with the direction and the current value of the motor current IM to be supplied to the electric motor 8. The PWM signal is inputted into a gate G1 of a power FET 25a or a gate G2 of a power FET 25b in the motor drive circuit 25, and drives the power FET 25a or the power FET 25b by PWM operation in accordance with the magnitude of the deviation signal ΔIM. The PWM signal is inputted into either the gate G1 or the gate G2 according to polarity of the deviation signal ΔIM. Of these gate G1 and G2, an OFF signal is inputted into the gate where the PWM signal is not inputted, and either the power FET 25a or the power FET 25b is off. When the PWM signal is inputted into the gate G1, an ON signal is inputted into the gate G4 of the power FET 25d, and therefore the power FET 25d is actuated. And when the OFF signal is inputted into the gate G1, an OFF signal is inputted into the gate G4 and therefore the power FET 25d is off. Meanwhile, when the PWM signal is inputted into the gate G2, an ON signal is inputted into the gate G3 of the power FET 25c and therefore the power FET 25c is actuated. And when the OFF signal is inputted into the gate G2, an OFF signal is inputted into the gate G3 and therefore the power FET 25c is off. The motor control signal VO consists of the PWM signal, the ON signal, and the OFF signal outputted to the gates G1 to G4 of the motor drive circuit.

A description will be given of the motor drive circuit 25. The motor drive circuit 25 comprises a bridge circuit composed of the four power FETs 25a, 25b, 25c and 25d, and a 12 V voltage is supplied thereto from the power supply voltage 25e. Furthermore, in the motor drive circuit 25, the electric motor 8 is connected in series between the power FET 25a and the power FET 25d and between the power FET 25b and the power FET 25c. The power FETs 25a and 25b are on when the PWM signal or the OFF signal is inputted into each of the gates G1, G2 and when the logical level is 1 by the result of inputting the PWM signal. The power FETs 25c and 25d are on when the ON signal or the OFF signal is inputted into each of the gates G3, G4 and when the ON signal is inputted. In the motor drive circuit 25, the electric motor 8 is driven with PWM in the forward rotational direction (the generated assist torque points to the rightward direction) by the power FET 25a and the power FET 25d and in the reverse rotational direction (the generated assist torque points to the leftward direction) by the power FET 25b and the power FET 25c. The motor voltage VM applied to the electric motor 8 is determined on the basis of the duty ratio of the PWM signal. The motor current IM flowing to the electric motor 8 is associating with the motor voltage VM. For example, if the duty ratio of the PWM signal is 7 (logical level 1): 3 (logical level 0), the motor voltage of 8.4 V, i.e. 12(V)×(7/10)=8.4(V), is applied. Therefore, the average of 8.4 V is applied to the electric motor 8.

With reference to FIGS. 2, 4A and 4B, the controller 12B and the shifting state detecting section 40 in the engine controller ECB according to the second embodiment will be described. FIGS. 4A and 4B are explanatory views of a shifting state detecting section according to the second embodiment of the invention, in which FIG. 4A shows the hardware configuration, and FIG. 4B is a setting table showing signal values of shifting state signals.

A description will be given of the shifting state detecting section 40 in the engine controller ECB. The engine controller ECB detects whether the shifting state is a vehicle driving state or a vehicle non-driving state because detection signals from a neutral switch NS and a clutch switch CS that are required in terms of control are inputted. For the purpose of simplifying the constitution of the electric power steering apparatus 1, the shifting state detecting section 40 is incorporated in the engine controller ECB, and the shifting state signal SB is transmitted from the engine controller ECB into the controller 12B. Therefore, the shifting state detecting section 40 is incorporated in the engine controller ECB, however, it is incorporated in the electric power steering apparatus 1.

The engine controller ECB is furnished in a five-speed manual transmission vehicle, and wholly controls the engine based on the control of fuel injection, ignition timing, idling engine rotational speed, etc. For this reason, the engine controller ECB comprises a CPU ECBa for processing various kinds of calculations or operations, input circuits ECBb, an output circuit ECBc, a memory (not shown), a power circuit (not shown), etc.

The shifting state detecting section 40 is incorporated in the CPU ECBa. A neutral switch signal N and a clutch switch signal C are inputted into the shifting state detecting section 40 respectively through the input circuit ECBb and the input circuit ECBb, and the shifting state detecting section 40 outputs a shifting state signal SB through the output circuit ECBc into the controller 12B. The shifting state detecting section 40 detects whether the shifting state is a vehicle non-driving state (viz. a neutral range or the clutch pedal is depressed) or a vehicle driving state (viz. a low gear, a second speed gear, a third speed gear, a fourth speed gear, or a fifth speed gear) on the basis of the neutral switch signal N and the clutch switch signal C.

A description will now be given of the neutral switch signal N and the clutch switch signal C. The neutral switch NS is turned to on/off on condition whether or not in the neutral, and transmits a neutral switch signal N. The neutral switch NS is on if set in the neutral, and is off if not set in the neutral. The clutch switch CS is turned to on/off on condition whether or not the clutch pedal is depressed, and transmits a clutch switch signal C. The clutch switch signal C is on when the clutch pedal is depressed, and is off when the clutch pedal is not depressed. Therefore, only when the neutral switch NS is off and the clutch switch CS is off, that is when not in the neutral and the clutch pedal is not depressed, the shifting state is a vehicle driving state (the low gear, the second speed gear, the third speed gear, the fourth speed gear, or the fifth speed gear).

The neutral switch NS and the clutch switch CS are connected to the ground at the time of "ON", and are open at the time of "OFF". Therefore, when the neutral switch NS is on, a LOW signal is inputted as the neutral switch signal N through the input circuit ECBb into the CPU ECBa. When the neutral switch NS is off, a HI signal is inputted, based on a constant-voltage power supply (5V) ECBd, as the neutral switch signal N through the input circuit ECBb into the CPU ECBa. Meanwhile, when the clutch switch CS is on, a LOW signal is inputted as the clutch switch signal C through the input circuit ECBb into the CPU ECBa. When the clutch switch CS is off, a HI signal is inputted, based on the constant-voltage power supply (5V) ECBd, as the clutch switch signal C through the input circuit ECBb into the CPU ECBa.

When the neutral switch signal N is a LOW signal and the clutch switch signal C is a LOW signal, the shifting state detecting section 40 determines that the shifting state is a vehicle non-driving state, and transmits a signal to the output circuit ECBc to make a transistor ECBe on. When the neutral switch signal N is a LOW signal and the clutch switch signal C is a HI signal, the shifting state detecting section 40 determines that the shifting state is a vehicle non-driving state, and transmits a signal to the output circuit ECBc to make the transistor ECBe on. Similarly, when the neutral switch signal N is a HI signal and the clutch switch signal C is a LOW signal, the shifting state detecting section 40 determines that the shifting state is a vehicle non-driving state, and transmits a signal to the output circuit ECBc to make the transistor ECBe on. On the other hand, when the neutral switch signal N is a HI signal and the clutch switch signal C is a HI signal, the shifting state detecting section 40 determines that the shifting state is a vehicle driving state, and transmits a signal to the output circuit ECBc to make the transistor ECBe off.

Accordingly, when in the neutral or/and when the clutch pedal is depressed (viz. when the shifting state is a vehicle non-driving state), the transistor ECBe at the output end of the engine controller ECB is on, whereby the shifting state signal SB becomes a LOW signal. Meanwhile, when the transmission gear is set in the low gear, the second speed gear, the third speed gear, the fourth speed gear, or the fifth speed gear and when the clutch pedal is not depressed (viz. when the shifting state is a vehicle driving state), the transistor ECBe at the output end of the engine controller ECB is off, whereby the shifting state signal SB becomes a HI signal by the constant-voltage power supply (5V) 12 Bc.

The controller 12B will be described in detail. The controller 12B is substantially the same as the controller 12A of the first embodiment except for the vehicle speed sensor failure determination section 21B. Herein, like reference characters designate like or corresponding parts of the controller 12A, and detailed description will be omitted. The controller 12B is provided with a CPU 12Ba for processing various kinds of calculations or operations, an input circuit 12Bb, an output circuit (not shown), a memory (not shown) such as ROM, a power circuit (not shown), etc.

In the second embodiment, the vehicle speed sensor failure determination section 21B is corresponding to a failure determination section defined in the claims.

A description will be given of the vehicle speed sensor failure determination section 21B. The vehicle speed signal V from the vehicle speed sensor VS, the engine rotational speed signal E from the engine rotational speed sensor ES, and the shifting state signal SB from the engine controller ECB are inputted into the vehicle speed sensor failure determination section 21B, and the vehicle speed sensor failure determination section 21B outputs the failure determination signal FF into the target current fading section 22. The vehicle speed sensor failure determination section 21B determines whether the vehicle speed sensor VS malfunctions on the basis of the vehicle speed signal V, the engine rotational speed signal E, and the shifting state signal SB, and sets the failure determination signal FF to a HI signal in the case of determination of failure of the vehicle speed sensor VS and to a LOW signal in the case of determination of normal of the vehicle speed sensor VS. The failure determination signal FF is transmitted to the meter M so that a warning lamp for the electric power steering apparatus 1 is lit on the meter M when the failure determination signal FF is a HI signal and the warning lamp is off when the failure determination signal FF is a LOW signal.

Likewise the shifting state signal SA to be inputted into the vehicle speed sensor failure determination section 21A, the shifting state signal SB to be inputted into the vehicle speed sensor failure determination section 21B is a LOW signal when the shifting state is a vehicle non-driving state and a HI signal when the shifting state is a vehicle driving state. Therefore, the signals to be inputted into the vehicle speed sensor failure determination section 21B are substantially the same as those of the vehicle speed sensor failure determination section 21A. Accordingly, the vehicle speed sensor failure determination section 21B processes the operation same as in the vehicle speed sensor failure determination section 21A to thereby set the failure determination signal FF, and the explanation thereof will be omitted.

Figure 5:
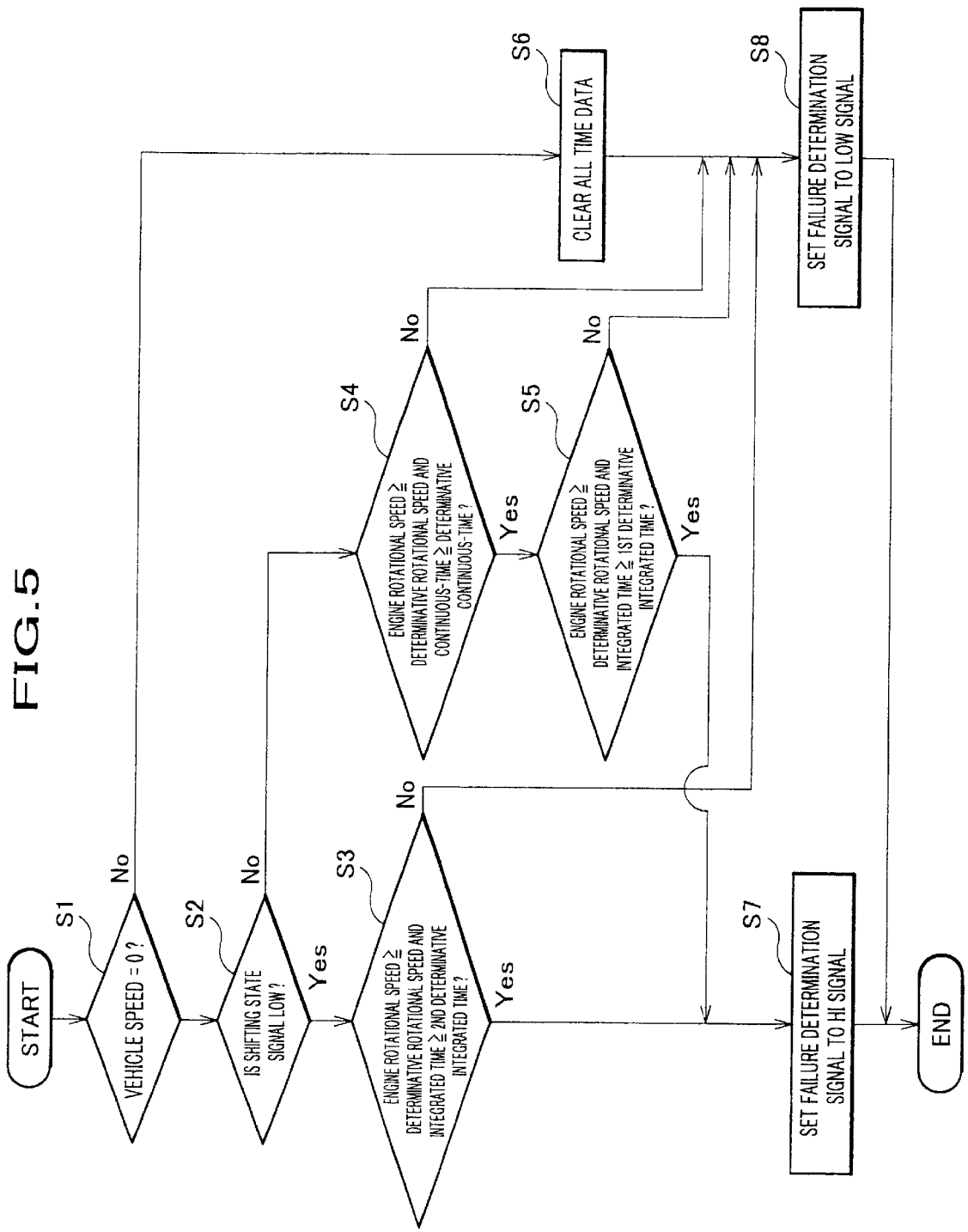
FIG. 5 is an operation flow chart at a vehicle speed sensor failure determination section according to first and second embodiments.

As mentioned above, the controller 12A according to the first embodiment and the controller 12B according to the second embodiment are substantially the same constitution except for the vehicle speed sensor failure determination sections 12A and 12B. Furthermore, the vehicle speed sensor failure determination section 12A and the vehicle speed sensor failure determination section 12B carry out the same operation. For this reason, control of the controller 12A in the electric power steering apparatus 1 and the control of the controller 12B will be described together with reference to FIGS. 1 to 4B. In particular, control at the vehicle speed sensor failure determination sections 21A, 21B will be described with reference to the flow chart of FIG. 5. FIG. 5 is an operation flow chart at a vehicle speed sensor failure determination section according to first and second embodiments. Processes at the CPU ECAa of the controller 12A and the CPU ECBa of the controller 12B are repeated at certain intervals, and a series of processes of the operation flow chart shown in FIG. 5 is also repeated at certain intervals. Herein, the explanation will be made as to when the vehicle speed sensor VS is normal, and when the vehicle speed sensor VS malfunctions, respectively.

Firstly, an instance where the vehicle speed sensor VS is normal will be described. The driver operates the vehicle by the steering wheel 3, the accelerator pedal (not shown) and the brake pedal (not shown) so as to drive the vehicle or to turn the steerable wheels W of the vehicle. When doing so, the electric power steering apparatus 1 detects the steering torque at the steering torque sensor TS, as well as detects the vehicle speed at the vehicle speed sensor VS.

The controller 12A, 12B sets the target current signal IMS at the target current setting section 20 on the basis of the steering torque signal T and the vehicle speed signal V.

The controller 12A, 12B determines at the vehicle speed sensor failure determination section 21A, 21B whether the vehicle speed obtained from the vehicle speed signal VS is 0 km/h (S1). In the normal driving of the vehicle, since the vehicle speed from the vehicle speed sensor VS is greater than 0 km/h, the vehicle speed sensor failure determination section 21A, 21B determines that the vehicle speed is not 0 km/h, and thereafter resets the continuous-time and the integrated time to zero (S6) so as to set a LOW signal as the failure determination signal FF (S8).

Meanwhile, if the vehicle speed obtained from the vehicle speed signal VS is 0 km/h, the vehicle speed sensor failure determination section 21A, 21B determines in step S1 that the vehicle speed is 0 km/h and thereafter determines whether or not the shifting state signal SA, SB is a LOW signal (S2).

If the shifting state signal SA, SB is a LOW signal (viz. when the shifting state is a vehicle non-driving state), the vehicle speed sensor failure determination section 21A, 21B determines whether the engine rotational speed obtained from the engine rotational speed signal E is equal to or greater than the determinative rotational speed and whether such a condition continues to the second determinative integrated time (S3). For this reason, the vehicle speed sensor failure determination section 21A, 21B starts to count an integrated time when the process in step S3 starts. In this event, even if the driver races the engine while the vehicle is parked, the driver certainly will not race the engine for the second determinative integrated time. Therefore, since the engine does not rotate at the determinative rotational speed or more for the second determinative integrated time, the vehicle speed sensor failure determination section 21A, 21B sets a LOW signal as the failure determination signal FF (S8).

On the contrary, if the shifting state signal SA, SB is a HI signal (viz. when the shifting state is a vehicle driving state), the vehicle speed sensor failure determination section 21A, 21B determines whether the condition such that engine rotational speed obtained from the engine rotational speed signal E is equal to or greater than the determinative rotational speed continues for the determinative continuous-time (S4). For this reason, the vehicle speed sensor failure determination section 21A, 21B starts to count a continuous-time when the process in step S4 starts. In this event, even if the vehicle speed sensor VS momentarily detects the vehicle speed of 0 km/h upon abrupt starting, the vehicle speed of 0 km/h will not be detected during the whole determinative continuous-time that is set for several tens of seconds because the vehicle is advancing. Therefore, the vehicle speed sensor failure determination section 21A, 21B will determine in step S1 that the vehicle speed is greater than 0 km/h before the condition such that the engine rotational speed is equal to or greater than the determinative rotational speed continues for the determinative continuous-time, and thereafter resets the continuous-time and the integrated time to zero (S6) so as to set a LOW signal as the failure determination signal FF (S8). Of course, if the engine rotational speed decreases below the determinative rotational speed before the continuous-time reaches the determinative continuous-time, the vehicle speed sensor failure determination section 21A, 21B sets a LOW signal as the failure determination signal FF (S8).

Furthermore, a determination error such that the vehicle speed sensor VS is determined as failure will be most probably prevented by the following determinations, even if the vehicle sensor VS detects the vehicle speed of 0 km/h for more than the determinative continuous-time at the time of abrupt starting because of the determinative continuous-time being set to an extremely short period of time. That is, even if it is determined in step S4 that the engine rotational speed is equal to or greater than a predetermined rotational speed for the determinative continuous-time, the vehicle speed sensor failure determination section 21A, 21B further determines whether or not the engine rotational speed is equal to or greater than a predetermined rotational speed for a first determinative integrated time (S5). For this reason, the vehicle speed sensor failure determination section 21A, 21B starts to count an integrated time when the process in step S5 starts. In this event, even if the vehicle speed sensor VS momentarily detects the vehicle speed of 0 km/h upon abrupt starting, the vehicle speed of 0 km/h will not be detected during the first determinative integrated time in addition to the determinative continuous-time because the vehicle is advancing. Therefore, the vehicle speed sensor failure determination section 21A, 21B will determine in step S1 that the vehicle speed is greater than 0 km/h before the condition such that the engine rotational speed is equal to or greater than the determinative rotational speed continues for the first determinative integrated time, and thereafter resets the continuous-time and the integrated time to zero (S6) so as to set a LOW signal as the failure determination signal FF (S8).

When the failure determination signal FF is a LOW signal (viz. when the vehicle speed sensor VS is normal), the controller 12A, 12B sets the target current signal IMS as the target current signal IMS' at the target current fading section 22. Although the failure determination signal FF is transmitted to the meter M, because it is a LOW signal, the warning lamp for the electric power steering apparatus 1 is off.

Furthermore, the controller 12A, 12B calculates the deviation signal ΔIM at the deviation calculating section 23 from the target current signal IMS' and the motor current signal IMO. The controller 12A, 12B further produces the motor control signal VO at the drive control section 24 on the basis of the deviation signal ΔIM. And the controller 12A, 12B generates in the motor drive circuit 25 the motor voltage VM associating with the motor control signal VO, and applies the thus generated motor voltage VM to the electric motor 8. The motor current IM associating with the target current signal IMS' then flows into the electric motor 8. Accordingly, in the electric power steering apparatus 1, the electric motor 8 drives in the forward rotational direction or the reverse rotational direction so as to apply assist torque to the steering system S.

Next, an instance where the vehicle speed sensor VS malfunctions will be described. The driver operates the vehicle by the steering wheel 3, the accelerator pedal (not shown) and the brake pedal (not shown) so as to drive the vehicle or to turn the steerable wheels W of the vehicle. When doing so, the electric power steering apparatus 1 detects the steering torque at the steering torque sensor TS. Since the vehicle speed sensor VS malfunctions, the vehicle speed signal V indicating the vehicle speed of 0 km/h is outputted.

The controller 12A, 12B sets the target current signal IMS at the target current setting section 20 on the basis of the steering torque signal T and the vehicle speed signal V. In this event, since the vehicle speed signal V indicates the vehicle speed of 0 km/h, the target current signal IMS is set to a large value.

The controller 12A, 12B determines at the vehicle speed sensor failure determination section 21A, 21B whether the vehicle speed obtained from the vehicle speed signal VS is 0 km/h (S1). In this event, the vehicle speed from the vehicle speed signal VS is 0 km/h because the vehicle speed sensor VS malfunctions. Therefore, the vehicle speed sensor failure determination section 21A, 21B determines in step S1 that the vehicle speed is 0 km/h, and thereafter determines whether or not the shifting state signal SA, SB is a LOW signal (S2).

If the shifting state signal SA, SB is a LOW signal (viz. when the shifting state is a vehicle non-driving state), the vehicle speed sensor failure determination section 21A, 21B determines whether the engine rotational speed is equal to or greater than the determinative rotational speed for the second determinative integrated time (S3). For this reason, the vehicle speed sensor failure determination section 21A, 21B starts to count an integrated time when the process in step S3 starts. In this event, if the condition such that the engine rotational speed is equal to or greater than the determinative rotational speed does not continue for the second determinative integrated time or if the engine rotational speed is less than the determinative rotational speed, the vehicle speed sensor failure determination section 21A, 21B sets a LOW signal as the failure determination signal FF (S8). In this instance, the vehicle speed sensor VS is not determined as failure irrespective of failure of the vehicle speed sensor VS. However, this is not a problem because the vehicle is supposed to be parked.

However, there may be an instance where the shifting state signal SA, SB is a LOW signal because the shifting state detecting section 30, 40 malfunctions or the shift position sensor SS, the neutral switch NS or the clutch switch CS malfunctions. However, if the actual shifting state is a vehicle driving state, the engine rotational speed is equal to or greater than the determinative rotational speed for the second determinative integrated time. Therefore, the vehicle speed sensor failure determination section 21A, 21B determines failure of the vehicle speed sensor VS, and sets a HI signal as the failure determination signal FF (S7).

Accordingly, if the vehicle speed sensor VS detects the vehicle speed of 0 km/h during the second determinative integrated time while the shifting state is a vehicle non-driving state and the engine rotational speed is equal to or greater than the determinative rotational speed, it is possible to presume that the vehicle speed sensor VS certainly malfunctions irrespective of the failure of the shifting state detecting section 30, 40.

On the contrary, if the shifting state signal SA, SB is a HI signal (viz. when the shifting state is a vehicle driving state), the vehicle speed sensor failure determination section 21A, 21B determines whether or not the condition such that the engine rotational speed obtained from the engine rotational speed signal E is equal to or greater than the determinative rotational speed continues for the determinative continuous-time (S4). For this reason, the vehicle speed sensor failure determination section 21A, 21B starts to count a continuous-time when the process in step S4 starts.

In this instance, since the vehicle speed obtained from the vehicle speed signal V is always 0 km/h, the vehicle speed sensor failure determination section 21A, 21B will not determine in step S1 that the vehicle speed is greater than 0 km/h. Therefore, in the normal driving of the vehicle, the vehicle speed sensor failure determination section 21A, 21B determines in step S4 that the engine rotational speed is equal to or greater than the determinative rotational speed for the determinative continuous-time, and further determines whether or not the engine rotational speed is equal to or greater than the determinative rotational speed for the first determinative integrated time (S5). For this reason, the vehicle speed sensor failure determination section 21A, 21B starts to count an integrated time when the process in step S5 starts.

Likewise the aforementioned process, since the vehicle speed obtained from the vehicle speed signal V is always 0 km/h, the vehicle speed sensor failure determination section 21A, 21B will not determine in step S1 that the vehicle speed is greater than 0 km/h. Therefore, in the normal driving of the vehicle, the vehicle speed sensor failure determination section 21A, 21B determines in step S5 that the engine rotational speed is equal to or greater than the determinative rotational speed for the first determinative integrated time (with the vehicle speed sensor VS being determined as failure), and further sets a HI signal as the failure determination signal FF (S7).

Accordingly, if the vehicle speed sensor VS detects the vehicle speed of 0 km/h during the determinative continuous-time and the first determinative integrated time while the shifting state is a vehicle driving state and the engine rotational speed is equal to or greater than the determinative rotational speed, it is possible to presume that the vehicle speed sensor VS most certainly malfunctions.

If the failure determination signal FF is a HI signal (viz. when the vehicle speed sensor VS malfunctions), the controller 12A, 12B sets the target current signal IMS' at the target current fading section 22 by converting the target current signal IMS in accordance with the fade map, so that the target current signal IMS' is set to a gradually decreasing value and is finally set to zero or a predetermined small value. The failure determination signal FF indicating a HI signal is transmitted to the meter M so that the warning lamp for the electric power steering apparatus 1 is lit.

Furthermore, the controller 12A, 12B calculates the deviation signal ΔIM at the deviation calculating section 23 from the target current signal IMS' and the motor current signal IMO. The controller 12A, 12B further produces the motor control signal VO at the drive control section 24 on the basis of the deviation signal ΔIM. And the controller 12A, 12B generates in the motor drive circuit 25 the motor voltage VM associating with the motor control signal VO, and applies the thus generated motor voltage VM to the electric motor 8. The motor current IM decreasing gradually in association with the target current signal IMS' then flows to the electric motor 8. Accordingly, in the electric power steering apparatus 1, the electric motor 8 drives in the forward rotational direction or the reverse rotational direction. However, the assist torque applied to the steering system S decreases gradually, and finally, no assist torque or a small assist torque is applied to the steering system S.

In the electric power steering apparatus 1 provided with the controller 12A, 12B according to the first and the second embodiments, since the vehicle speed sensor failure determination section 21A, 21B concerns the determination conditions such as the determinative continuous-time and the first determinative integrated time, and determines failure of the vehicle speed sensor VS on the basis of the vehicle speed signal V, the engine rotational speed signal E and the shifting state signal SA, SB, it is possible to eliminate a determination error such that the vehicle speed sensor VS is determined falsely as failure in the case of abrupt starting. Furthermore, in this electric power steering apparatus 1, since the vehicle speed sensor failure determination section 21A, 21B concerns the determination condition such as the second determinative integrated time, and determines failure of the vehicle speed sensor VS on the basis of the vehicle speed signal V, the engine rotational speed signal E and the shifting state signal SA, SB, it is possible to eliminate a determination error such that the vehicle speed sensor VS is determined falsely as failure in the case of racing the engine. Therefore, the electric power steering apparatus 1 is capable of highly accurately determining failure of the vehicle speed sensor VS.

Furthermore, in the electric power steering apparatus 1 provided with the controller 12A, 12B according to the first and second embodiments, since the shifting state detecting section 30, 40 is incorporated in the engine controller ECA, ECB, it is possible to simplify the constitution and to thereby reduce the cost. Furthermore, in the electric power steering apparatus 1, since the warning lamp is lit or the assist torque is gradually decreased with the fade processing if the vehicle speed sensor VS malfunctions, it is possible to notify safely the driver of failure of the electric power steering apparatus With reference to FIG. 2, the controller 12C according to the third embodiment and the racing detecting section (not shown) in the engine controller ECC will be described in detail.

A description will be given of the racing detecting section (not shown) in the engine controller ECC. Since the detection signals from the engine rotational speed sensor ES and the intake air volume sensor (not shown) that are required in terms of control are inputted into the engine controller ECC, it is possible to detect racing of the engine. For the purpose of simplifying the constitution of the electric power steering apparatus 1, the racing detecting section is incorporated in the engine controller ECC, and the racing state signal R is transmitted from the engine controller ECC into the controller 12C. Therefore, the racing detecting section is incorporated in the engine controller ECC, however, it is incorporated in the electric power steering apparatus 1.

The engine controller ECC wholly controls the engine based on the control of fuel injection, ignition timing, idling engine rotational speed, etc. For this reason, the engine controller ECC comprises a CPU (not shown) for processing various kinds of calculations or operations, an input circuit (not shown), an output circuit (not shown), a power circuit (not shown), etc.

The racing detecting section is incorporated in the CPU. The engine rotational speed signal E and the intake air volume signal are inputted into the racing detecting section through the input circuit, and the racing state signal R is outputted to the controller 12C through the output circuit. The racing detecting section searches a map of engine rotational speed and intake air volume regarding racing state region and non-racing state region with the use of the engine rotational speed obtained from the engine rotational speed signal E and the intake air volume obtained from the intake air volume signal as an address, the map of which is set based on previous experimental values or design values, and then detects whether or not in the racing state. The racing state signal R is set in the racing state such that a LOW signal is inputted into the CPU of the controller 12C. Meanwhile, the racing state signal R is set in the non-racing state such that a HI signal is inputted into the CPU of the controller 12C.

The controller 12C will be described in detail. The controller 12C is substantially the same as the controller 12A of the first embodiment except for the vehicle speed sensor failure determination section 21C. Herein, like reference characters designate like or corresponding parts of the controller 12A, and detailed description will be omitted. The controller 12C is provided with a CPU (not shown) for processing various kinds of calculations or operations, an input circuit (not shown), an output circuit (not shown), a memory (not shown) such as ROM, a power circuit (not shown), etc.

In the third embodiment, the vehicle speed sensor failure determination section 21C is corresponding to a failure determination section defined in the claims.

A description will be given of the vehicle speed sensor failure determination section 21C. The vehicle speed signal V from the vehicle speed sensor VS, the engine rotational speed signal E from the engine rotational speed sensor ES, and the racing state signal R from the engine controller ECC are inputted into the vehicle speed sensor failure determination section 21C, and the vehicle speed sensor failure determination section 21C outputs the failure determination signal FF into the target current fading section 22. The vehicle speed sensor failure determination section 21C determines whether the vehicle speed sensor VS malfunctions on the basis of the vehicle speed signal V, the engine rotational speed signal E, and the racing state signal R, and sets a HI signal as the failure determination signal FF in the case of determination of failure of the vehicle speed sensor VS and a LOW signal in the case of determination of normal of the vehicle speed sensor VS. The failure determination signal FF is transmitted to the meter M so that a warning lamp for the electric power steering apparatus 1 is lit on the meter M when the failure determination signal FF is a HI signal and the warning lamp is off when the failure determination signal FF is a LOW signal.

The vehicle speed sensor failure determination section 21C determines whether the vehicle speed is 0 km/h on the basis of the vehicle speed signal V, and sets the failure determination signal FF to a LOW signal when the vehicle speed is greater than 0 km/h.

Next, the vehicle speed sensor failure determination section 21C determines whether the engine rotational speed is equal to or greater than the determinative rotational speed on the basis of the engine rotational speed signal E, and sets the failure determination signal FF to a LOW signal when the engine rotational speed is less than the determinative rotational speed.

If the engine rotational speed is equal to or greater than the determinative rotational speed, the vehicle speed sensor failure determination section 21C determines whether or not in the racing state on the basis of the racing state signal R, and sets the failure determination signal to a LOW signal in the case of determination of the racing state (viz. when the racing state signal R is a LOW signal). The reason why the vehicle speed sensor VS is not determined as failure while the driver races the engine is that the vehicle speed is 0 km/h and the engine rotational speed is equal to or greater than the determinative rotational speed may be continued to several tens of seconds.

If not in the racing state (viz. when the racing state signal R is a HI signal), the vehicle speed sensor failure determination section 21C starts to count a continuous-time as soon as the engine rotational speed becomes equal to or greater than the determinative rotational speed while not in the racing state (viz. the racing state signal R is a HI signal). And the vehicle speed sensor failure determination section 21C determines whether or not the continuous time presently counting reaches the determinative continuous-time, and sets the failure determination signal to a LOW signal if the vehicle speed becomes greater than 0 km/h before the continuous-time reaches the determinative continuous-time, if the engine rotational speed becomes less than the determinative rotational speed or if turned to the racing state. The reason why the vehicle speed sensor VS is not determined as failure as long as the continuous-time does not reach the determinative continuous-time is that the vehicle speed sensor VS may detect the vehicle speed of 0 km/h in the case of abrupt starting and the like notwithstanding that the engine rotational speed is equal to or greater than the determinative rotational speed. Furthermore, the reason why the continuous-time is considered as a determination condition is to eliminate a determination error at the time of abrupt starting with the greatest possible care.

When the continuous-time reaches the determinative continuous-time, the vehicle speed sensor failure determination section 21C starts to count an integrated time. And the vehicle speed sensor failure determination section 21C determines whether the integrated time presently counting reaches the first determinative integrated time, and sets the failure determination signal FF to a LOW signal if the vehicle speed becomes greater than 0 km/h before the integrated time reaches the first determinative integrated time or if tuned to the racing state. The reason why the integrate time is also considered as a determination condition is to eliminate a determination error at the time of abrupt starting with great reliability and to determine failure of the vehicle speed sensor VS accurately.

If the integrated time reaches to the first determinative integrated time, the vehicle speed sensor failure determination section 12C determines that the vehicle speed sensor VS malfunctions, and sets the failure determination signal FF to a HI signal.

Figure 6:
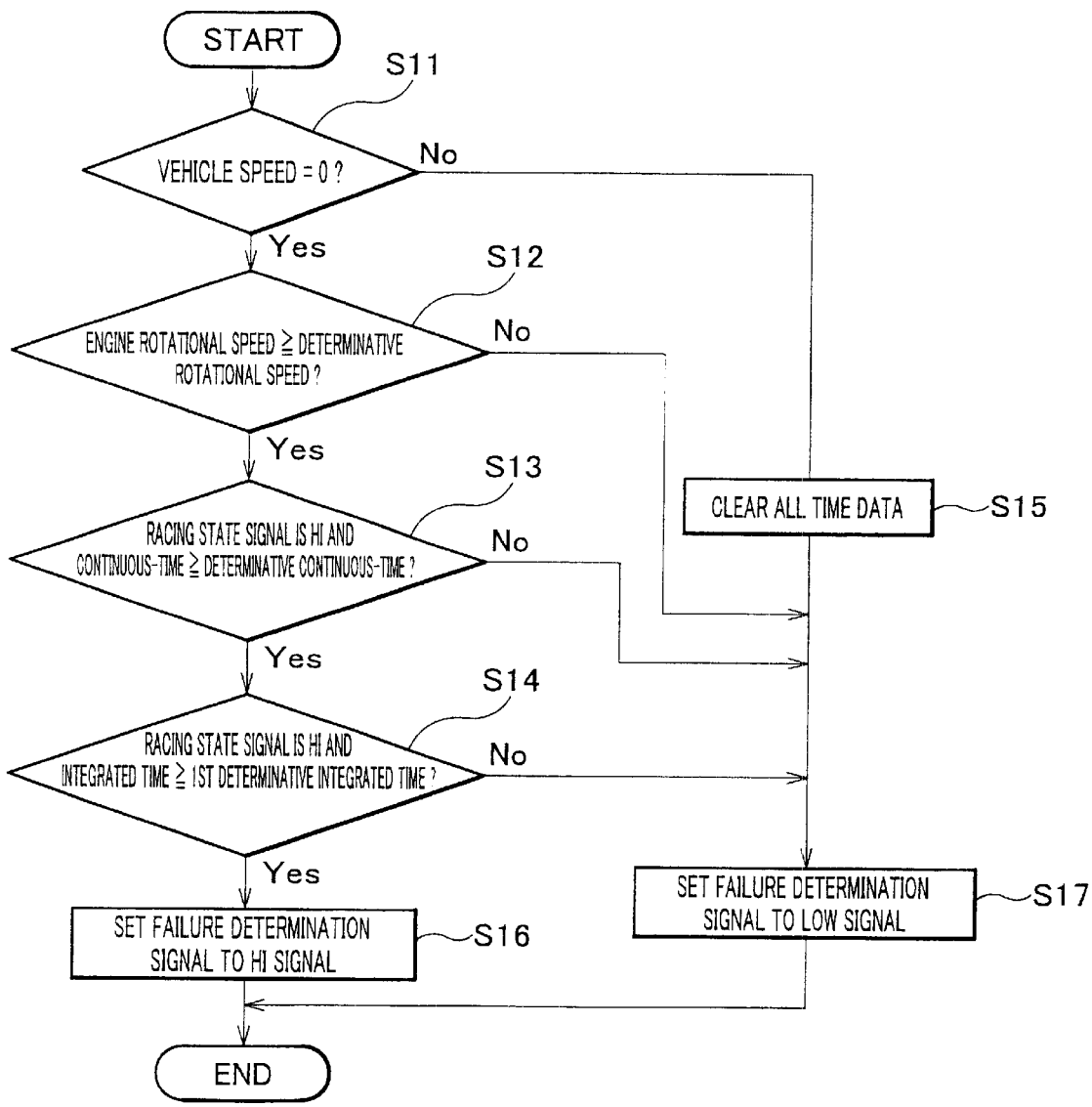
FIG. 6 is an operation flow chart at a vehicle speed sensor failure determination section according to a third embodiment.

Finally, with reference to FIGS. 1 and 2, control of the controller 12C in the electric power steering apparatus 1 will be described. In particular, control at the vehicle speed sensor failure determination section 21C will be described with reference to the flow chart of FIG. 6. FIG. 6 is an operation flow chart at the vehicle speed sensor failure determination section according to the third embodiment. Processes at the CPU of the controller 12C are repeated at certain intervals, and a series of processes of the operation flow chart shown in FIG. 6 is also repeated at certain intervals. Herein, the explanation will be made as to when the vehicle speed sensor VS is normal, and when the vehicle speed sensor VS malfunctions, respectively.

Firstly, an instance where the vehicle speed sensor VS is normal will be described. The driver operates the vehicle by the steering wheel 3, the accelerator pedal (not shown) and the brake pedal (not shown) so as to drive the vehicle or to turn the steerable wheels W of the vehicle. When doing to, the electric power steering apparatus 1 detects the steering torque at the steering torque sensor TS, as well as detects the vehicle speed at the vehicle speed sensor VS.

The controller 12C sets the target current signal IMS at the target current setting section 20 on the basis of the steering torque signal T and the vehicle speed signal V.

The controller 12C determines at the vehicle speed sensor failure determination section 21C whether the vehicle speed obtained from the vehicle speed signal VS is 0 km/h (S11). In the normal driving of the vehicle, since the vehicle speed from the vehicle speed sensor VS is greater than 0 km/h, the vehicle speed sensor failure determination section 21C determines that the vehicle speed is not 0 km/h, and thereafter resets the continuous-time and the integrated time to zero (S15) so as to set a LOW signal as the failure determination signal FF (S17) Meanwhile, if the vehicle speed obtained from the vehicle speed signal VS is 0 km/h, the vehicle speed sensor failure determination section 21C determines in stet S11 that the vehicle speed is 0 km/h and thereafter determines whether or not the engine rotational speed obtained from the engine rotational speed sensor ES is equal to or greater than the determinative rotational speed (S12). And if the engine rotational speed is less than the determinative rotational speed, the vehicle speed sensor failure determination section 21C sets a LOW signal as the failure determination signal FF (S17) because the vehicle speed sensor VS may have detected the vehicle speed of 0 km/h.

If the engine rotational speed is equal to or greater than the determinative rotational speed, the vehicle speed sensor failure determination section 21C determines whether the condition such that the racing state signal R is a HI signal (viz. not in the racing state) continues for the determinative continuous-time (S13). For this reason, the vehicle speed sensor failure determination section 21C starts to count a continuous-time when the process in step S13 starts. In this event, even if the vehicle speed sensor VS momentarily detects the vehicle speed of 0 km/h upon abrupt starting, the vehicle speed of 0 km/h will not be detected during the determinative continuous-time that is set for several tens of seconds because the vehicle is advancing. Therefore, the vehicle speed sensor failure determination section 21C will determine in step S11 that the vehicle speed is greater than 0 km/h before the condition such that the engine rotational speed is equal to or greater than the determinative rotational speed continues for the determinative continuous-time, and thereafter resets the continuous-time and the integrated time to zero (S15) so as to set a LOW signal as the failure determination signal FF (S17) Of course, if the engine rotational speed decreases below the determinative rotational speed before the continuous-time reaches the determinative continuous-time or if the racing state signal R is turned to a LOW signal (viz. in the racing state), the vehicle speed sensor failure determination section 21C sets a LOW signal as the failure determination signal FF (S17). Because of this determination condition in step S13, it is possible to eliminate a determination error such that the vehicle speed sensor VS is determined falsely as failure.

Furthermore, a determination error such that the vehicle speed sensor VS is determined as failure will be most certainly prevented by the following control, even if the vehicle sensor VS detects the vehicle speed of 0 km/h for more than the determinative continuous-time at the time of abrupt starting because of the determinative continuous-time being set to an extremely short period of time. That is, even if it is determined in step S13 that the condition such that the racing state signal R is a HI signal continues for the determinative continuous-time, the vehicle speed sensor failure determination section 21C further determines whether the condition such that the racing state signal R is a HI signal continues for the first determinative integrated time (S14). For this reason, the vehicle speed sensor failure determination section 21C starts to count an integrated time when the process in step S14 starts. In this event, even if the vehicle speed sensor VS momentarily detects the vehicle speed of 0 km/h upon abrupt starting, the vehicle speed of 0 km/h will not be detected during the first determinative integrated time in addition to the determinative continuous-time because the vehicle is advancing. Therefore, the vehicle speed sensor failure determination section 21C will determine in step S11 that the vehicle speed is greater than 0 km/h before the condition such that the racing state signal R is a HI signal continues for the first determinative integrated time, and thereafter resets the continuous-time and the integrated time to zero (S15) so as to set a LOW signal as the failure determination signal FF (S17)

When the failure determination signal FF is a LOW signal (viz. when the vehicle speed sensor VS is normal), the controller 12C sets the target current signal IMS as the target current signal IMS' at the target current fading section 22. Although the failure determination signal FF is transmitted to the meter M, because it is a LOW signal, the warning lamp for the electric power steering apparatus 1 is off.

Furthermore, the controller 12C calculates the deviation signal ΔIM at the deviation calculating section 23 from the target current signal IMS' and the motor current signal IMO. The controller 12C further produces the motor control signal VO at the drive control section 24 on the basis of the deviation signal ΔIM. And the controller 12C generates in the motor drive circuit 25 the motor voltage VM associating with the motor control signal VO, and applies the thus generated motor voltage VM to the electric motor 8. The motor current IM associating with the target current signal IMS' then flows into the electric motor 8. Accordingly, in the electric power steering apparatus 1, the electric motor 8 drives in the forward rotational direction or the reverse rotational direction so as to apply assist torque to the steering system S.

Next, an instance where the vehicle speed sensor VS malfunctions will be described. The driver operates the vehicle by the steering wheel 3, the accelerator pedal (not shown) and the brake pedal (not shown) so as to drive the vehicle or to turn the steerable wheels W of the vehicle. When doing so, the electric power steering apparatus 1 detects the steering torque at the steering torque sensor TS. Since the vehicle speed sensor VS malfunctions, the vehicle speed signal V indicating the vehicle speed of 0 km/h is outputted.

The controller 12C sets the target current signal IMS at the target current setting section 20 on the basis of the steering torque signal T and the vehicle speed signal V. In this event, since the vehicle speed signal V indicates the vehicle speed of 0 km/h, the target current signal IMS is set to a large value.

The controller 12C determines at the vehicle speed sensor failure determination section 21C whether the vehicle speed obtained from the vehicle speed signal VS is 0 km/h (S11). In this event, the vehicle speed from the vehicle speed signal VS is 0 km/h because the vehicle speed sensor VS malfunctions. Therefore, the vehicle speed sensor failure determination section 21C determines in step S11 that the vehicle speed is 0 km/h, and thereafter determines whether or not the engine rotational speed obtained from the engine rotational speed sensor ES is equal to or greater than the determinative rotational speed (S12).

If the engine rotational speed is less than the determinative rotational speed, the vehicle speed sensor failure determination section 21C sets a LOW signal as the failure determination signal FF (S17).

Meanwhile, if the engine rotational speed is equal to or greater than the determinative rotational speed, because there may be a possibility that the vehicle speed sensor VS malfunctions, the vehicle speed sensor failure determination section 21C determines whether the condition such that the racing state signal R is a HI signal continues for the determinative continuous-time (S13). For this reason, the vehicle speed sensor failure determination section 21C starts to count a continuous-time when the process in step S13 starts. In this event, since the vehicle speed obtained from the vehicle speed signal V is always 0 km/h, the vehicle speed sensor failure determination section 21C will not determine in step S11 that the vehicle speed is greater than 0 km/h. Therefore, in the normal driving of the vehicle, the vehicle speed sensor failure determination section 21C determines in step S13 that the condition such that the racing state signal R is a HI signal continues for the determinative continuous-time, and further determines whether the condition such that the racing state signal R is a HI signal continues for the first determinative integrated time (S14). For this reason, the vehicle speed sensor failure determination section 21C starts to count an integrated time when the process in step S14 starts.

Likewise the aforementioned process, since the vehicle speed obtained from the vehicle speed signal V is always 0 km/h, the vehicle speed sensor failure determination section 21C will not determine in step S11 that the vehicle speed is greater than 0 km/h. Therefore, in the normal driving of the vehicle, the vehicle speed sensor failure determination section 21C determines in step S14 that the condition such that the racing state signal R is a HI signal continues for the first determinative integrated time (with the vehicle speed sensor VS being determined as failure), and further sets a HI signal as the failure determination signal FF (S16).

Accordingly, if the vehicle speed sensor VS detects the vehicle speed of 0 km/h during the determinative continuous-time and the first determinative integrated time, while not in the racing state and the engine rotational speed is equal to or greater than the determinative rotational speed, it is possible to presume that the vehicle speed sensor VS most certainly malfunctions.

If the failure determination signal FF is a HI signal (viz. when the vehicle speed sensor VS malfunctions), the controller 12C sets the target current signal IMS' at the target current fading section 22 by converting the target current signal IMS in accordance with the fade map, so that the target current signal IMS' is set to a gradually decreasing value and is finally set to zero or a predetermined small value. The failure determination signal FF indicating a HI signal is transmitted to the meter M so that the warning lamp for the electric power steering apparatus 1 is lit.

Furthermore, the controller 12C calculates the deviation signal ΔIM at the deviation calculating section 23 from the target current signal IMS' and the motor current signal IMO. The controller 12C further produces the motor control signal VO at the drive control section 24 on the basis of the deviation signal ΔIM. And the controller 12C generates in the motor drive circuit 25 the motor voltage VM associating with the motor control signal VO, and applies the thus generated motor voltage VM to the electric motor 8. The motor current IM decreasing gradually in association with the target current signal IMS' then flows to the electric motor 8. Accordingly, in the electric power steering apparatus 1, the electric motor 8 drives in the forward rotational direction or the reverse rotational direction. However, the assist torque applied to the steering system S decreases gradually, and finally, no assist torque or a small assist torque is applied to the steering system S.

In the electric power steering apparatus 1 provided with the controller 12C according to the third embodiment, since the vehicle speed sensor failure determination section 21C determines failure of the vehicle speed sensor VS on the basis of the vehicle speed signal V, the engine rotational speed signal E, and the racing state signal R, it is possible to eliminate a determination error such that the vehicle speed sensor VS is determined falsely as failure in the case of racing the engine. Furthermore, in this electric power steering apparatus 1, since the vehicle speed sensor failure determination section 21C concerns the determination conditions such as the determinative continuous-time and the first determinative integrated time, it is possible to eliminate a determination error such that the vehicle speed sensor VS is determined falsely as failure in the case of abrupt starting. Therefore, the electric power steering apparatus 1 is capable of highly accurately determining failure of the vehicle speed sensor VS.

Furthermore, in the electric power steering apparatus 1 provided with the controller 12C according to the third embodiment, since the racing detecting section is incorporated in the engine controller ECC, it is possible to simplify the construction and to thereby reduce the cost. Furthermore, in the electric power steering apparatus 1, since the warning lamp is lit or the assist torque is gradually decreased with the fade processing if the vehicle speed sensor VS malfunctions, it is possible to notify safely the driver of failure of the electric power steering apparatus 1.

While the invention has been described in detail and with reference to specific embodiments thereof, it will be apparent to one skilled in the art that various changes and modifications can be made therein without departing from the spirit and scope thereof.

For example, in the preferred embodiments, the shifting state detecting section or the racing detecting section is incorporated in the engine controller. However, the shifting state detecting section or the racing detecting section may be incorporated in the controller of the electric power steering apparatus. If the shifting state detecting section is incorporated in the controller, a detection signal from the shift position sensor is transmitted to the controller in the case of an automatic transmission vehicle, and ON/OFF signals from the neutral switch and the clutch switch are transmitted to the controller in the case of a manual transmission vehicle. Meanwhile, if the racing detecting section is incorporated in the controller, a detection signal from the intake air volume sensor other than the engine rotational speed signal is transmitted to the controller.

Furthermore, in the preferred embodiments, the determinative continuous-time and the first determinative integrated time are considered as determination conditions. However merely one of the conditions may be considered as a determination condition.

Furthermore, in the preferred embodiments, a fade process is applied to the target current signal when the vehicle speed sensor is determined as failure. However, the fade process may be applied to the motor control signal. Alternatively, it is possible to control the electric power steering apparatus by maintaining the vehicle speed at a constant speed or in accordance with a vehicle behavior and the like.

What is claimed is:

1. An electric power steering apparatus comprising:
   an electric motor applying an assist torque to a steering system;
   a vehicle speed detecting section detecting a vehicle speed of the vehicle;
   a shifting state detecting section detecting a shifting state of the vehicle;
   an engine rotational speed detecting section detecting an engine rotational speed; and
   a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section, the shifting state detected by the shifting state detecting section, and the engine rotational speed detected by the engine rotational speed detecting section, and wherein the failure determination section determines that the vehicle speed detecting section malfunctions if the engine rotational speed is equal to or greater than a predetermined rotational speed for a determinative continuous-time and/or a first determinative integrated time while the vehicle speed is zero and the shifting state is a vehicle driving state.

2. An electric power steering apparatus comprising:

an electric motor applying an assist torque to a steering system;

a vehicle speed detecting section detecting a vehicle speed of the vehicle;

a shifting state detecting section detecting a shifting state of the vehicle;

an engine rotational speed detecting section detecting an engine rotational speed; and a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section, the shifting state detected by the shifting state detecting section, and the engine rotational speed detected by the engine rotational speed detecting section, and wherein the failure determination section determines that the vehicle speed detecting section malfunctions if the engine rotational speed is equal to or greater than a predetermined rotational speed for a second determinative integrated time while the vehicle speed is zero and the shifting state is not a vehicle driving state.

3. An electric power steering apparatus according to claim 1, wherein said shifting state detecting section is incorporated in an engine control section, and the engine control section inputs a shifting state signal to the motor control section.

4. An electric power steering apparatus according to claim 2, wherein said shifting state detecting section is incorporated in an engine control section, and the engine control section inputs a shifting state signal to the motor control section.

5. An electric power steering apparatus comprising:

an electric motor applying an assist torque to a steering system;

a vehicle speed detecting section detecting a vehicle speed of the vehicle;

an engine rotational speed detecting section detecting an engine rotational speed; and a motor control section for controlling drive of the electric motor based on an output from the vehicle speed detecting section, wherein the motor control section includes a failure determination section for determining failure of the vehicle speed detecting section on the basis of the vehicle speed detected by the vehicle speed detecting section and the engine rotational speed detected by the engine rotational speed detecting section; and a racing detecting section detecting a racing state of the vehicle, wherein the failure determination section determines that the vehicle speed detecting section malfunctions if the racing detecting section detects a non-racing state while the vehicle speed is zero and the engine rotational speed is equal to or greater than a predetermined rotational speed.

6. An electric power steering apparatus according to claim 5, wherein the failure determination section determines that the vehicle speed detecting section malfunctions if the racing detecting section detects a non-racing state for a determinative continuous-time and/or a first determinative integrated time while the vehicle speed is zero and the engine rotational speed is equal to or greater than a predetermined rotational speed.

7. An electric power steering apparatus according to claim 5, wherein said racing detecting section is incorporated in an engine control section, and the engine control section inputs a racing state signal to the motor control section.

8. An electric power steering apparatus according to claim 6, wherein said racing detecting section is incorporated in an engine control section, and the engine control section inputs a racing state signal to the motor control section.

* * * * *